(12) United States Patent
Stiesdal (10) Patent No.: US 8,991,183 B2
(45) Date of Patent: Mar. 31, 2015

(54) THERMAL ENERGY STORAGE AND RECOVERY DEVICE AND SYSTEM HAVING A HEAT EXCHANGER ARRANGEMENT USING A COMPRESSED GAS

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 150 days.

(21) Appl. No.: 13/809,691

(22) PCT Filed: Apr. 20, 2011

(86) PCT No.: PCT/EP2011/056378
§ 371 (c)(1),
(2), (4) Date: Jan. 11, 2013

(87) PCT Pub. No.: WO2012/007196
PCT Pub. Date: Jan. 19, 2012

(65) Prior Publication Data
US 2013/0111904 A1    May 9, 2013

(30) Foreign Application Priority Data

Jul. 12, 2010 (EP) .................................. 10007149
Nov. 4, 2010 (EP) .................................. 10190006

(51) Int. Cl.
*F02C 1/05* (2006.01)
*F01K 3/00* (2006.01)
(Continued)

(52) U.S. Cl.
CPC . *F28D 17/04* (2013.01); *F02C 6/14* (2013.01); *F28D 20/00* (2013.01); *F28D 20/0056* (2013.01); *F28F 27/02* (2013.01); *F01K 3/004* (2013.01); *F05D 2220/72* (2013.01); *F05D 2220/76* (2013.01); *Y02E 20/14* (2013.01); *Y02E 60/142* (2013.01)
USPC .................................. 60/650; 60/659; 60/682

(58) Field of Classification Search
CPC ..... F28D 17/04; F28D 20/00; F28D 20/0056; F02C 6/14; F02C 3/004; F28F 27/02; F05D 2220/76; F05D 2220/72; Y02E 20/14; Y02E 60/142
USPC .......................................... 60/650, 659, 682
See application file for complete search history.

(56) References Cited

U.S. PATENT DOCUMENTS 4,142,576 A    3/1979  Perry
4,347,706 A *  9/1982  Drost ............................. 60/659
(Continued)

FOREIGN PATENT DOCUMENTS

CH    686641 A5    5/1996
CN    1464967 A    12/2003
(Continued)

*Primary Examiner* — Hoang Nguyen (57) ABSTRACT

A thermal energy storage and recovery device is disclosed which includes a heat exchanger arrangement configured for guiding a flow of a heat transfer medium between a first end and a second end, and a heat storage material surrounding the heat exchanger arrangement so that a thermal interaction region is formed for thermally coupling the heat transfer medium with the heat storage material. The heat exchanger arrangement is sealed against the heat storage material so that, when in a first operational mode, in which the heat storage material is supposed to receive thermal energy from the heat transfer medium, a compressed gas is usable as the heat transfer medium for transferring thermal energy from the heat transfer medium to the heat storage material.

15 Claims, 4 Drawing Sheets

(51) Int. Cl.
  *F01K 25/02* (2006.01)
  *F28D 17/04* (2006.01)
  *F02C 6/14* (2006.01)
  *F28D 20/00* (2006.01)
  *F28F 27/02* (2006.01)

(56) References Cited

U.S. PATENT DOCUMENTS

| | | | | |
|---|---|---|---|---|
| 4,520,862 | A | | 6/1985 | Helmbold |
| 5,448,889 | A | * | 9/1995 | Bronicki .................... 60/641.14 |
| 8,297,056 | B2 | * | 10/2012 | Ashikian ......................... 60/650 |
| 2008/0066736 | A1 | | 3/2008 | Zhu |
| 2010/0251711 | A1 | * | 10/2010 | Howes et al. ................... 60/659 |

FOREIGN PATENT DOCUMENTS

| | | |
|---|---|---|
| DE | 2828675 A1 | 1/1980 |
| FR | 2566883 A1 | 1/1986 |
| JP | 58110404 | 7/1983 |
| JP | 63201494 | 8/1988 |
| JP | 2001147033 A | 5/2001 |
| JP | 2002242694 A | 8/2002 |
| JP | 2004508531 A | 3/2004 |
| JP | 2005337664 A | 12/2005 |
| JP | 2007285550 A | 11/2007 |
| JP | 2008215780 A | 9/2008 |
| JP | 4679990 B2 | 5/2011 |
| WO | WO 9214054 A1 | 8/1992 |
| WO | WO 9628703 A2 | 9/1996 |
| WO | WO 0225203 A1 | 3/2002 |

* cited by examiner

THERMAL ENERGY STORAGE AND RECOVERY DEVICE AND SYSTEM HAVING A HEAT EXCHANGER ARRANGEMENT USING A COMPRESSED GAS

CROSS REFERENCE TO RELATED APPLICATIONS

This application is the US National Stage of International Application No. PCT/EP2011/056378, filed Apr. 20, 2011 and claims the benefit thereof. The International Application claims the benefits of European Application No. 10007149.7 filed Jul. 12, 2010 and European Application No. 10190006.6 filed Nov. 4, 2010. All of the applications are incorporated by reference herein in their entirety.

FIELD OF INVENTION

The present invention relates to the field of temporarily storing thermal energy. In particular, the present invention relates to a thermal energy storage and recovery device comprising a heat exchanger arrangement and a heat storage material. Further, the present invention relates to a thermal energy storage and recovery system comprising such a thermal energy storage and recovery device.

ART BACKGROUND

The production of electric power from various types of alternative energy sources such as for instance wind turbines, solar power plants and wave energy plants is not continuous. The production may be dependent on environmental parameters such as for instance wind speed (for wind turbines), sunshine intensity (for solar power plant) and wave height and direction (for wave energy plants). There is very often little or no correlation between energy production and energy demand.

One known approach to solve the problem of uncorrelated electric power production and electric power demand is to temporally store energy, which has been produced but which has not been demanded, and to release the stored energy at times at which there is a high demand. In the past there have been suggested many different methods to temporarily store energy. Suggested methods are for instance (a) mechanical energy storage methods e.g. pumped hydro storage, compressed air storage and flywheels, (b) chemical energy storage methods e.g. electrochemical batteries and organic molecular storage, (c) magnetic energy storage, and (d) thermal energy storage.

WO 92/14054 A1 discloses a wind-powered energy production and storing system comprising a wind rotor in driving engagement with a power generator via transmission means, to which is also connected a heat pump for operation of at least one heat exchanger unit. The wind rotor is designed as a wind wheel having a rim in direct driving engagement with a main shaft positioned in a subjacent engine housing to which main shaft, in addition to the power generator and the heat pump, a dual circulation pump is coupled for conveying heated and cooled liquid, from a heating container and a cooling container, respectively, positioned in the engine housing to separate heat and cold storing stations. Via a steam separator and a pumping device, a steam generator may be connected to the heat storing station which via a steam turbine drives an additional power generator for power production during periods of slack winds. The storing stations may be buried in soil having a filling of sand, stones or similar materials. One disadvantage of this wind-powered energy production and storing system is that there is a direct mechanical connection between the energy storage and recovery system and the wind turbine and that all the energy storage equipment, besides the storing stations, is placed in the wind turbine resulting in a complex mechanical arrangement of the system components. This causes the known system to be not flexible.

There may be a need for improving the temporal storage of thermal energy in particular with respect to the flexibility and the efficiency of a thermal energy storage and recovery system.

SUMMARY OF THE INVENTION

This need may be met by the subject matter according to the independent claims. Advantageous embodiments of the present invention are described by the dependent claims.

According to a first aspect of the invention there is provided a thermal energy storage and recovery device, which comprises (a) a heat exchanger arrangement, which is configured for guiding a flow of a heat transfer medium between a first end of the heat exchanger arrangement and a second end of the heat exchanger arrangement, and (b) a heat storage material, which surrounds the heat exchanger arrangement in such a manner that a thermal interaction region is formed for thermally coupling the heat transfer medium with the heat storage material. The heat exchanger arrangement is sealed against the heat storage material in such a manner that, if the thermal energy storage and recovery device is in a first operational mode, in which the heat storage material is supposed to receive thermal energy from the heat transfer medium, a compressed gas, which has been heated up by a gas compression, is usable as the heat transfer medium for transferring thermal energy from the heat transfer medium to the heat storage material.

The described thermal energy storage and recovery device is based on the idea that by employing a heated up compressed gas as an input (e.g. via the first end) to the thermal energy storage and recovery device a very high efficiency of the thermal energy storage is possible. Thereby, energy and in particular mechanical energy being left in compressed gas which is returned from the thermal energy storage and recovery device as an output (e.g. via the second end) can be used to help driving a compression procedure resulting in the heated up compressed air being fed to the first end of the heat exchanger arrangement.

The heating up of the compressed gas can be realized for instance by an adiabatic process wherein no heat is exchanged with the surroundings during the compression procedure.

The gas can be for instance air or any other kind of gas such as e.g. Argon and/or Nitrogen.

The first end and the second end may be located at one and the same side of the thermal energy storage and recovery device. By placing the inlet end and the outlet end of the heat exchanger arrangement relatively close to each other a heat loss caused by long fluid (heat transfer medium) feeding pipes and/or long fluid return pipes to or from the heat exchanger arrangement can be minimized.

According to an embodiment of the invention the heat exchanger arrangement is adapted to (a) transport the heat transfer medium from the first end to the second end, if the thermal energy storage and recovery device is in the first operational mode, and (b) transport the heat transfer medium from the second end to the first end, if the thermal energy storage and recovery device is in a second operational mode, in which the heat storage material is supposed to release thermal energy to the heat transfer medium.

By employing different transport directions of the heat transfer medium for different operational modes, a highly efficient thermal energy storage can be realized. Thereby, one can achieve an outlet temperature of the heat transfer medium at least at some time during the second operational mode, which outlet temperature is not significantly smaller than the inlet temperature of the heat transfer medium at least at some time during the first operational mode. This means that the during the second operational mode the heat transfer medium can be received from the thermal energy storage and recovery device almost with the same (high) temperature as compared to the temperature with which the heat transfer medium is provided to the thermal energy storage during the first operational mode. Thereby, the efficiency of the heat storage process can be significantly increased.

The described principle of using (a) a first transport direction from the first end to the second end for charging the heat storage material with thermal energy and (b) an opposite second transport direction from the second end to the first end for discharging the heat storage material from thermal energy can be interpreted as employing a counter current principle.

Specifically, in the first operational mode (i.e. charging the heat storage material with thermal energy), a hot compressed gas or a heated up compressed gas is let into the first end. After having transferred at least a part of its thermal energy the at least partially cooled down compressed gas is returned at the second end. Correspondingly, in the second operational mode (i.e. discharging thermal energy from the heat storage material) a comparatively cold heat transfer medium (e.g. a steam or also a compressed gas) is let into the second end. After having received thermal energy from the heat storage material the at least partially heated up heat transfer medium is returned at the first end.

In other words, when taking benefit from the described counter current principle the inlet end of the heat exchanger arrangement for hot compressed gas when charging the thermal energy storage and recovery device may be the same as the outlet end of the heat exchanger arrangement for heated up heat transfer medium when discharging the thermal energy storage and recovery device. Correspondingly, the outlet end of the heat exchanger arrangement for cooled down compressed gas when charging the thermal energy storage and recovery device may be the same as the inlet end of the heat exchanger arrangement for cold heat transfer medium when discharging the thermal energy storage and recovery device.

In this respect it is explicitly mentioned that also during the second operational state compressed gas may be used as the heat transfer medium. However, it is pointed out that it is also possible that for the second operational state also other heat transfer media could be used such as in particular an appropriate fluid i.e. a liquid or a gaseous medium.

According to a further embodiment of the invention the heat exchanger arrangement comprises (a) a first heat exchange section being associated with the first end, (b) a second heat exchange section being associated with the second end, (c) a first connecting section connecting the first heat exchange section with the second heat exchange section and (d) a second connecting section connecting the first heat exchange section with the second heat exchange section parallel to the first connecting section. Thereby, at least one of the connecting sections comprises a valve for controlling the flow of the heat transfer medium through the respective connecting section.

This may provide the advantage that the heat exchange capacity of the heat exchanger arrangement and/or the thermal energy storage capacity of the thermal energy storage and recovery device can be adapted to actual operating conditions. For instance by closing (opening) the valve the effective amount or mass of the heat storage material, which contributes to the described thermal heat storage, can be reduced (increased). The same holds for the overall heat transfer rate between the heat exchanger arrangement and the heat storage material.

Generally speaking, by changing the setting or the adjustment of the valve a decrease or an increase of the heat exchange capacity and of the thermal energy storage capacity may be realized. Thereby, the thermal energy storage and recovery device can be adapted to currently present operating conditions.

It is mentioned that apart from one or more valves also heating means and/or cooling means like e.g. heating circuits and/or cooling circuits may be used for operating the thermal energy storage and recovery device within an energy storage and recovery system in order to optimize the inlet and/or outlet temperatures of the described thermal energy storage and recovery device. Thereby, the energy storage efficiency may be further increased.

It is further mentioned that one or more of the valves may be thermostat controlled and/or remote controlled.

According to a further embodiment of the invention the heat exchanger arrangement is made from pipes. The pipes can be made from any material, which is sufficiently leak-proof in order to keep the compressed gas within the heat exchanger arrangement. Preferably, the material being used for the pipes is steel and/or concrete.

According to a further embodiment of the invention the thermal energy storage and recovery device further comprises thermal insulating means (a) for thermally isolating the whole thermal energy storage and recovery device from its environment and/or (b) for thermally isolating different compartments of the thermal energy storage and recovery device from each other. This may provide the advantage that the thermal energy storage and recovery device can be at least partially thermally decoupled from its surrounding environment and/or different compartments or regions of the device can be at least partially thermally decoupled from each such that the effective size of the thermal energy storage and recovery device can be optimized in view of given operating conditions.

The thermal insulation means may comprise e.g. mineral wool, glass wool, rock wool or other preferably similar insulating materials.

According to a further embodiment of the invention the heat storage material comprises a solid material such as in particular sand, soil, ashes, stones and/or gravel. Of course, also other materials which are preferably also relatively cheap and which comprise similar thermal properties may be used.

According to a further embodiment of the invention the first end comprises a single first opening and the second end comprises a single second opening. Thereby, (a) in the first operational mode the first opening is used for receiving compressed gas, which has been heated up by a gas compression, and the second opening is used for emitting cooled down compressed gas and (b) in the second operational mode the second opening is used for receiving a cold fluid and the first opening is used for emitting a hot fluid representing heated up cold fluid. This may provide the advantage that a single heat exchanger arrangement is sufficient for realizing the described counter current heat exchange principle.

It is mentioned that the fluids being used for the second operational state as the heat exchange medium may also be compressed gas. However, the fluids being used for the second operational state may also be a (superheated) steam at least when the heat transfer medium is at its higher temperature. This may mean that when discharging or extracting thermal energy from the described thermal energy storage and recovery device, a cold liquid fluid (e.g. water) may be heated up such that it is converted into a gaseous or at least partially gaseous steam. This may be in particular advantageous if the extracted thermal energy is used for driving a steam turbine which itself drives an electric power generator.

According to a further embodiment of the invention the thermal energy storage and recovery device further comprises (a) a further heat exchanger arrangement, which is configured for guiding a flow of a further heat transfer medium between a further first end of the further heat exchanger arrangement and a further second end of the further heat exchanger arrangement, and (b) a further heat storage material, which surrounds the further heat exchanger arrangement in such a manner that a further thermal interaction region is formed for thermally coupling the further heat transfer medium with the further heat storage material. This may provide the advantage that a further heat transfer medium can be used for charging and/or discharging the described thermal energy storage and recovery device. Thereby, the further heat transfer medium may be a different fluid than the compressed gas being used as the heat transfer medium. Alternatively, also the further heat transfer medium may be compressed gas. Anyway, the heat transfer medium (i.e. compressed gas) and the further heat transfer medium (i.e. compressed gas or another fluid) are guided through different heat transfer pipes through the heat storage material.

The further heat storage material being associated with the further heat exchanger arrangement may be the same or may be a different material as compared to the heat storage material being associated with the above described heat exchanger arrangement.

The various inlet ends and outlet ends of both the heat exchanger arrangement and the further heat exchanger arrangement may also just be used to let originally cold fluid and originally hot fluid flow in separate chambers or tubes of the thermal energy storage and recovery device. Thereby, in order to recover stored energy only the originally cold fluid is flowing through the device and in order to store energy only the originally hot fluid is flowing through the device.

According to a further embodiment of the invention the heat exchanger arrangement and the further heat exchanger arrangement form a counter current heat exchanger system, wherein (a) the further heat transfer medium and the heat transfer medium are transportable simultaneously and wherein (b) the further heat transfer medium is transportable in an opposite direction with respect to the heat transfer medium.

Generally speaking, the described counter current heat exchanger system may let both heat transfer media travel through the respective pipes of the heat exchanger arrangement respectively of the further heat exchanger arrangement at the same time but in opposite directions with respect to each other. In this way the heat transfer media move in opposite directions along each other in separate chambers or tubes of the counter current heat exchanger system. Thereby, the velocity of the hot inlet flow into the counter current heat exchanger system may differ from the velocity of the cold inlet flow into the counter current heat exchanger system. This may provide the advantage that the stored thermal energy can be slowly tapped or slowly stored depending on the velocity of the cold and/or the hot inlet flows.

According to a first aspect of the invention there is provided a thermal energy storage and recovery system which comprises (a) a thermal energy storage and recovery device as described above, (b) a heat generating arrangement, which is connected directly or indirectly to the thermal energy storage and recovery device and which is adapted to heat up the heat transfer medium, which has been received from the thermal energy storage and recovery device and which is supposed to be transported to the thermal energy storage and recovery device, and (c) a heat consumption arrangement, which is connected directly or indirectly to the thermal energy storage and recovery device and which is adapted to receive thermal energy from heat transfer medium, which has been heated up by the thermal energy storage and recovery device.

The described thermal energy storage and recovery system is based on the idea, that when the above described thermal energy storage and recovery device co-operates with a heat generating arrangement and with a heat consumption arrangement a highly efficient temporal heat storage and heat recovery can be realized.

The heat generating arrangement may be any device which is capable of converting energy, in particular electric energy, into thermal energy. The generated respectively converted thermal energy is then transferred to the thermal energy storage and recovery device via the heat transfer medium.

In case of a direct (thermal) connection between the thermal energy storage and recovery device and the heat generating arrangement, the heat transfer medium being used by the thermal energy storage and recovery device is the same as the operating medium of the heat generating arrangement. In case of an indirect connection different fluids may be used for the heat transfer medium and for the operating medium. The thermal connection between the two fluids may then be realized by means of a heat exchanger and/or by means of a condenser.

The heat consumption arrangement may be any device, which is capable of converting thermal energy into mechanical and/or electric energy which can be fed for instance into a power grid.

In case of a direct (thermal) connection between the thermal energy storage and recovery device and the heat consumption arrangement, the heat transfer medium being used by the thermal energy storage and recovery device is the same as the operating medium of the heat converting arrangement. In case of an indirect connection different fluids may be used for the heat transfer medium and for the operating medium. The thermal connection between the two fluids may then be realized for instance by means of a heat exchanger and/or by means of an evaporator.

Preferably, the thermal energy storage and recovery device comprises two heat exchanger arrangements, in particular the above described heat exchanger arrangement and the above described further heat exchanger arrangement, wherein one heat exchanger arrangement being associated with the heat generating arrangement is operated with compressed gas and the other heat exchanger arrangement is associated with the heat consumption arrangement.

According to an embodiment of the invention the heat generating arrangement comprises (a) a compressor for feeding the thermal energy storage and recovery device with the compressed gas, which has been heated up by the gas compression, and (b) a gas turbine for receiving from the thermal energy storage and recovery device cooled down heat transfer medium. This may provide the advantage that the described heated up compressed gas, which is used for loading the thermal energy storage and recovery device with thermal energy, may be generated easily and in an effective manner. Since the thermal energy storage and recovery device will cool down the gas during its passage through the heat exchanger arrangement of the thermal energy storage and recovery device, the gas pressure at the outlet of the thermal energy storage and recovery device will be smaller than the pressure of the hot compressed gas at the input of the thermal energy storage and recovery device.

According to a further embodiment of the invention the gas turbine comprises a gas outlet for delivering outlet gas being used for cooling surrounding air in at least one room of at least one building. This may provide the advantage that an air conditioning can be realized in an energetically efficient way.

It is mentioned that the outlet air provided by the air outlet of the air turbine can be used directly or indirectly via a dedicated heat exchanging device to perform the described cooling.

According to a further embodiment of the invention the heat generating arrangement further comprises a motor driving the compressor, wherein the gas turbine is mechanically connected to the motor. This may provide the advantage that a high efficiency of the heat generating arrangement can be achieved.

Specifically, after having fed hot compressed gas as an inlet to the heat exchanger arrangement in the thermal energy storage and recovery device then a cooled compressed gas may be returned at the outlet of the heat exchanger arrangement, wherein the cooled compressed gas may be fed into the gas turbine which may be mechanically connected to a shaft being common for the gas turbine and for a compressor helping driving the compressor and thereby increasing the efficiency of the described thermal energy storage and recovery device.

The heat generating arrangement may comprise an electric boiler and/or a heat pump. This may provide the advantage that electric energy, which has been generated in particular by an alternative energy source such as a wind turbine, can be converted into heat which can be stored as thermal energy within the above described thermal energy storage and recovery device.

In particular, a heat pump may provide the advantage of a very efficient heat generation. When using a heat pump electric energy may be first converted into mechanical energy of a compressor, which in accordance with the well known physical principle of a heat pump compresses a gaseous heat pump medium and circulates the same around a closed loop comprising inter alia a condenser and an evaporator. Thereby, the energy being released within the condenser may be used to heat up the heat transfer medium which is then forwarded to the thermal energy storage and recovery device. In this respect it is mentioned that the described evaporator may be driven by air, by a further cooling means and/or by pumped return water e.g. from a district heating installation.

According to a further embodiment of the invention the heat consumption arrangement comprises (a) a steam turbine, which in the second operational state receives hot heat transfer medium from the thermal energy storage and recovery device, and/or (b) a circulation pump for feeding a cold heat transfer medium to the thermal energy storage and recovery device. Using a steam turbine may provide the advantage that a highly efficient conversion of the recovered thermal energy can be achieved.

In this respect "hot heat transfer medium" may mean that because of its previous passage through the thermal energy storage and recovery device the originally cooler or cold heat transfer medium has been heated up. Further, "cold heat transfer medium" may mean that during its following passage through the thermal energy storage and recovery device the cold heat transfer medium will be heated up.

A rotating shaft of the steam turbine may be connected to an electric power generator, which is capable of converting the mechanical energy being provided by the steam turbine into electric energy, which can be easily fed to a power grid and/or which can be directly consumed by at least one electric consumer.

The steam turbine may be connected to a condenser, wherein the operating medium of the steam turbine, after it has been delivered its energy to the steam turbine, is converted into its liquid phase.

The described condenser may be a part of a further closed loop, which apart from the steam turbine and the condenser may comprise inter alia a pump and an evaporator. Thereby, energy being released from the thermal energy storage and recovery device may be transferred to the steam turbine via the mentioned evaporator, wherein the operating medium of the steam turbine is transferred from the liquid phase into the gaseous phase.

The described condenser may be driven by air, by a further cooling means and/or by pumped return water from a district heating installation.

According to a further embodiment of the invention the heat consumption arrangement further comprises a district heating installation system, which (a) receives heat transfer medium from the steam turbine and which (b) provides heat transfer medium to the circulation pump.

The district heating installation system may comprise a heat exchanger system which thermally connects the heat transfer medium with a fluid such as for instance water. Thereby, the district heating installation may receive comparatively cold water from a water installation via a water inlet and may provide hot or warm water to the water installation via a water outlet.

According to a further embodiment of the invention the thermal energy storage and recovery system further comprises a control unit, which is connected to at least one of (a) the thermal energy storage and recovery device, (b) the heat generating arrangement and (c) the heat consumption arrangement. The control unit is adapted to control the operation of the thermal energy storage and recovery system.

Specifically, the control unit may be coupled to one or more of the following components: (a) compressor of the heat generating arrangement, (b) a valve of the heat generating arrangement, (c) at least one valve of the thermal energy storage and recovery device, (d) at least one circulation pump driving the heat transfer medium through the thermal energy storage and recovery device, (e) a (steam) turbine of the heat consumption arrangement, (f) a feed pump of the heat converting arrangement, (g) a circulation pump for a cold medium being cycled within a cold reservoir cycle, wherein the cold medium drives (g1) an evaporator of the heat generating arrangement (realized by means of the above described heat pump) and/or (g2) a condenser of the heat consumption arrangement (comprises inter alia a steam turbine).

It has to be noted that embodiments of the invention have been described with reference to different subject matters. Specifically, some embodiments have been described with reference to claims being directed to a thermal energy storage and recovery device whereas other embodiments have been described with reference to claims being directed to thermal energy storage and recovery system. However, a person skilled in the art will gather from the above and the following description that, unless other notified, in addition to any combination of features belonging to one type of subject matter also any combination between features relating to different subject matters is considered as to be disclosed with this document. Further, when taking benefit of the disclosure of this document the person skilled in the art will understand the operation of the described thermal energy storage and recovery device and system. Hence, any arbitrary combination of at least some of the above described features may also be used to formulate a claim for operating the described thermal energy storage and recovery device and/or the described thermal energy storage and recovery system.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
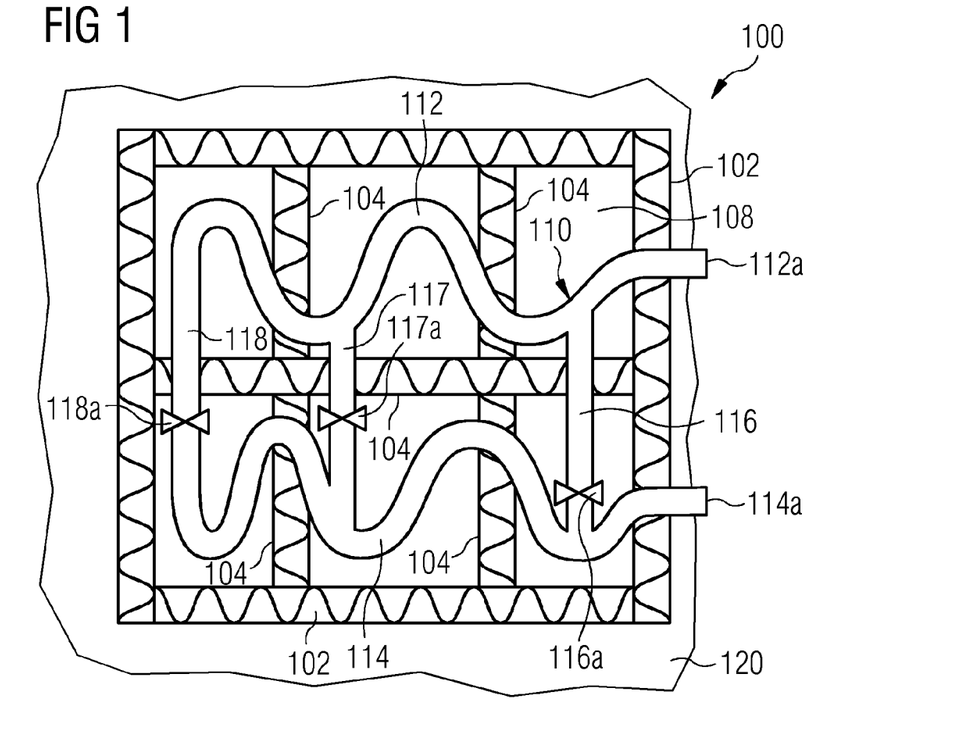
FIG. 1 shows a sectional top view of a thermal energy storage and recovery device with a heat exchanger arrangement, which comprises a first heat exchange section being associated with the first end, a second heat exchange section being associated with the second end and three connecting sections connecting in parallel the first heat exchange section with the second heat exchange section.

FIG. 1 shows a sectional top view of a thermal energy storage and recovery device 100. The thermal energy storage and recovery device 100 comprises a casing 102, which comprises an insulating material. Therefore, the casing 102 represents an outer insulation wall 108 of the thermal energy storage and recovery device 100. The thermal energy storage and recovery device 100 further comprises inner insulation walls 104, which segment the volume of the thermal energy storage and recovery device 100 into different regions. According to the embodiment described here both the outer insulation walls 108 and the inner insulation walls 104 comprise a mineral wool.

The casing 102 is filled with a heat storage material 108. The heat storage material 108 may comprise sand, soil, ashes, gravel, stone and/or other kind of solid material, which preferably comprises a large specific heat capacity. The whole thermal energy storage and recovery device 100 is embedded within ground 120, which may also comprise soil, gravel, stones, rock, ashes and/or sand or similar materials.

The thermal energy storage and recovery device 100 further comprises a heat exchanger arrangement 110. The heat exchanger arrangement 110 is embedded with the heat storage material 108. The heat exchanger arrangement 110 comprises a first heat exchange section 112 being associated with a first end 112a of the heat exchanger arrangement 110, a second heat exchange section 114 being associated with a second end 114a of the heat exchanger arrangement 110 and three connecting sections 116, 117 and 118 connecting in parallel the first heat exchange section 112 with the second heat exchange section 114. Within each connecting sections 116, 117 and 118 there is provided a valve 116a, 117a and 118a, respectively. The valves 116a, 117a and 118a can be controlled by a non depicted control unit such that each of the three connecting sections 116, 117 and 118 can be opened, closed or partially opened/closed individually. By closing one or more of the valves 116a, 117a and 118a a flow of heat transfer medium through the heat exchanger arrangement 110 can be controlled. Thereby, sub-regions of the thermal energy storage and recovery device 100, which are associated with a closed valve, can be effectively decoupled from the remaining regions of the thermal energy storage and recovery device 100. This means that by opening one valve and closing one or more of the other valves the energy storage capacity may be decreased or increased as the used capacity of the heat exchanger arrangement 100 is decreased or increased.

The described thermal energy storage and recovery device 100 may be of the size of more than 1000 m long, 100 m wide and 5 m deep. This results in a volume of 500,000 $m^3$. As has already been mentioned above the heat storage material may be sand filled with sand, which has a specific heat capacity of 0.8 kJ/(kg K) and a sand density of 1740 kg/$m^3$. When the sand 108 is heated up from a temperature of 20° C. to 200° C. (=temperature difference of 180° C.), this results in a heat storage capacity of up to 125280 GJ. This corresponds to 34.8 GWh.

Of course, also thermal energy storage and recovery devices having other sizes and other operating temperatures may be used in order to get other heat storage capacities.

When operating the thermal energy storage device 100 different operational modes are used (a) for charging the thermal energy storage and recovery device 100 with thermal energy and (b) for discharging the thermal energy storage and recovery device 100, i.e. for retrieving thermal energy from the thermal energy storage and recovery device 100. Specifically, in a first operational mode in which the thermal energy storage and recovery device 100 is charged by receiving thermal energy from a heated up or hot compressed air representing the heat transfer medium, the compressed air is transported from the first end 112a to the second end 114a. In a second operational mode in which the thermal energy storage and recovery device 100 is discharged by providing thermal energy to the heat transfer medium, a heat transfer medium is transported from the second end 114a to the first end 112a. The heat transfer medium being used for the second operational mode may be also compressed air and/or a steam e.g. comprising water.

The described dependency of the transport direction of the heat transfer medium from the operational state can be seen as employing a counter current principle. By using this counter current principle, when thermal energy is recovered from the thermal energy storage and recovery device 100, it is possible to heat up the cold heat transfer medium to nearly the same temperature as the inlet temperature of the hot heat transfer medium (i.e. the compressed air) when thermal energy is inserted into the thermal energy storage and recovery device 100. This makes the thermodynamic efficiency of the described thermal energy storage and recovery device 100 very high.

It is mentioned that according to the embodiment described here the thermal energy storage and recovery device 100 further comprises a further not depicted further heat exchanger arrangement having a further first heat exchange section with a further first end and a further second heat exchange section with a further second end. Hot fluid may then be fed into one of the first ends and returned in one of the second ends and a cold fluid may be fed into the other first end and returned in the other second end using the counter current principle. Thereby, with respect to the heat exchanger arrangement 110 the further heat exchanger arrangement may comprise separate cavities or tubes.

Figure 2:
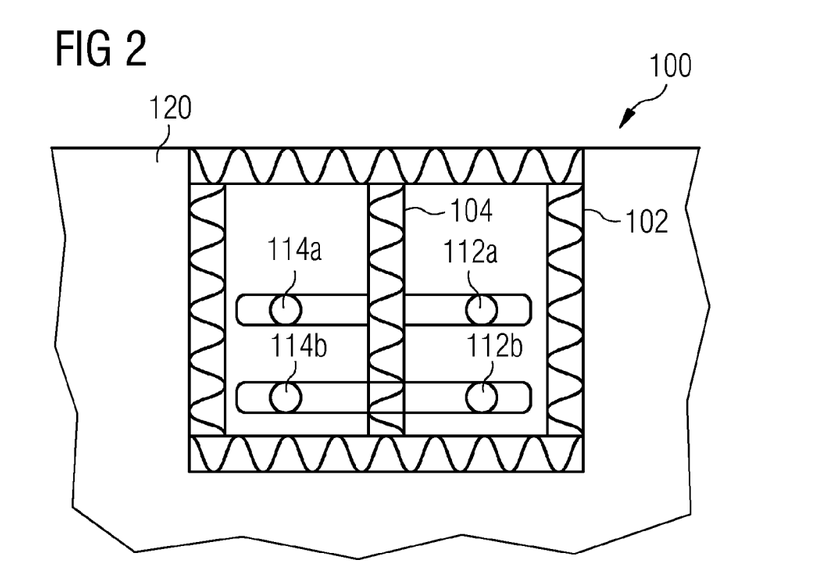
FIG. 2 shows a sectional top view of the thermal energy storage and recovery device depicted in FIG. 1.

FIG. 2 shows a sectional top view of the thermal energy storage and recovery device 100. The ends 112a and 114a of the heat exchanger arrangement 100 can be seen on the front side of the thermal energy storage and recovery device 100. Further, in accordance with the embodiment described above, on the right side of the thermal energy storage and recovery device 100 there are provided the first end 112a and a further first end 112b of the further heat exchanger arrangement. Accordingly, on the left side of the thermal energy storage and recovery device 100 there are provided the second end 114a and a further second end 114b of the further heat exchanger arrangement.

It is mentioned that in the orientation depicted in FIG. 2 the thermal energy storage and recovery device 100 may be placed down into the ground 120.

Figure 3:
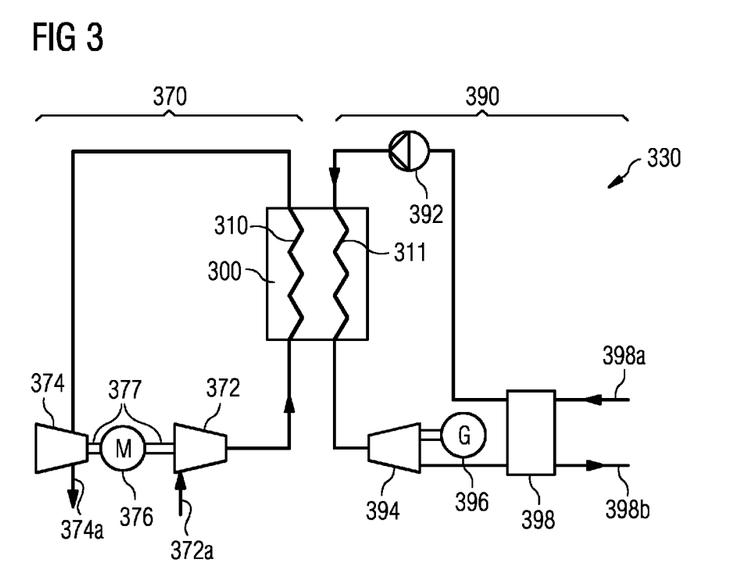
FIG. 3 shows a schematic illustration of a thermal energy storage and recovery system in accordance with a first embodiment of the invention.

FIG. 3 shows a schematic illustration of a thermal energy storage and recovery system 330 in accordance with a first embodiment of the invention. To store energy within a thermal energy storage and recovery device 300 a heat generating arrangement 370 is used. To recover energy from the thermal energy storage and recovery device 300 a heat consumption arrangement 390 is used.

As can be seen from FIG. 3, the heat generating arrangement 370 comprises a compressor 372, which is driven be a motor 376. The compressor 372 comprises an air inlet 372a. The air in the air inlet 372a may have a temperature of e.g. 20 Celsius degrees and a pressure of e.g. 1 bar. During compression of the air the pressure may rise to e.g. 25 bar and the temperature may rise to e.g. 500 Celsius degrees. This heated up and compressed air is fed into an inlet of a heat exchanger arrangement 310 of the thermal energy storage and recovery device 300. The compressed air then returns via an outlet of the heat exchanger arrangement 310 now having a temperature of e.g. 20 Celsius degrees and a pressure of still nearly 25 bar.

The compressed outlet air is then fed into an air turbine 374. According to the embodiment described here the air turbine 374 and the motor 376 and the compressor 372 have a common shaft 377. This provides the advantage that the air turbine 374 will help the motor 376 driving the compressor 372 such that the efficiency of the heat generating arrangement 370 will be increased.

The temperature of expanded outlet air being provided by the air turbine 374 via an air outlet 374a may e.g. fall to minus one degrees Celsius (−1° C.) when the air is expanded from a pressure of 25 bar to 1 bar. This makes the expanded outlet air from the air turbine 374 suitable for cooling purposes, e.g. for air conditioning of the surrounding air in one or more rooms in one or more buildings.

To recover stored energy a cold fluid with a temperature of e.g. 20 degrees Celsius is fed into an inlet of a further heat exchanger arrangement 311 of the thermal energy storage and recovery device 300. According to the embodiment described here this is done by a circulation pump 392. The circulation pump 392 collects water from a district heating installation 398 which comprises a water inlet 498a.

After passage through the further heat exchanger arrangement 311 the fluid has an outlet temperature, which is significantly larger than the inlet temperature of the fluid at the inlet of the further heat exchanger arrangement 311. Due to the described counter current fluid flow within the thermal energy storage and recovery device 300 the outlet temperature of the fluid leaving the further heat exchanger arrangement 311 is almost the same as the inlet temperature of the hot compressed air, which has entered the heat exchanger arrangement 310.

In this way the cold fluid is converted to steam which may be further overheated by heating means (not depicted) before the steam is let into a steam turbine 394 which drives an electric power generator 396 through a shaft connection. Optionally, the steam may further be let into a condenser (not shown) where it turns into water. This condenser may be driven by air (ambient air, stationary or ventilation). Alternatively or in combination return water from the district heating installation 398 may be pumped through the condenser in order to cool the steam. The condensed water may by pumped back to the district heating installation 398 and returned by a water outlet 398b of the district heating installation 498. The electric power generator 396 may be connected to a utility grid (not shown) as well as a wind turbine or other kind of alternative energy resources (not shown).

In this way electrical energy produced by e.g. a wind turbine may be used by the motor 376 to drive the compressor 372 and to feed compressed air through the thermal energy storage and recovery device 300 and to store the thermal energy in the heat storage material such as sand or other similar solid material with high heat capacity. In periods with no or with little wind or perhaps in periods with too high wind speeds where the wind turbines stands still water may be pumped through the thermal energy storage and recovery device 300 heating it up to steam which then drives the steam turbine 394. The steam turbine 394 drives the electrical power generator 396 which supplies electrical energy to the utility grid.

Figure 4:
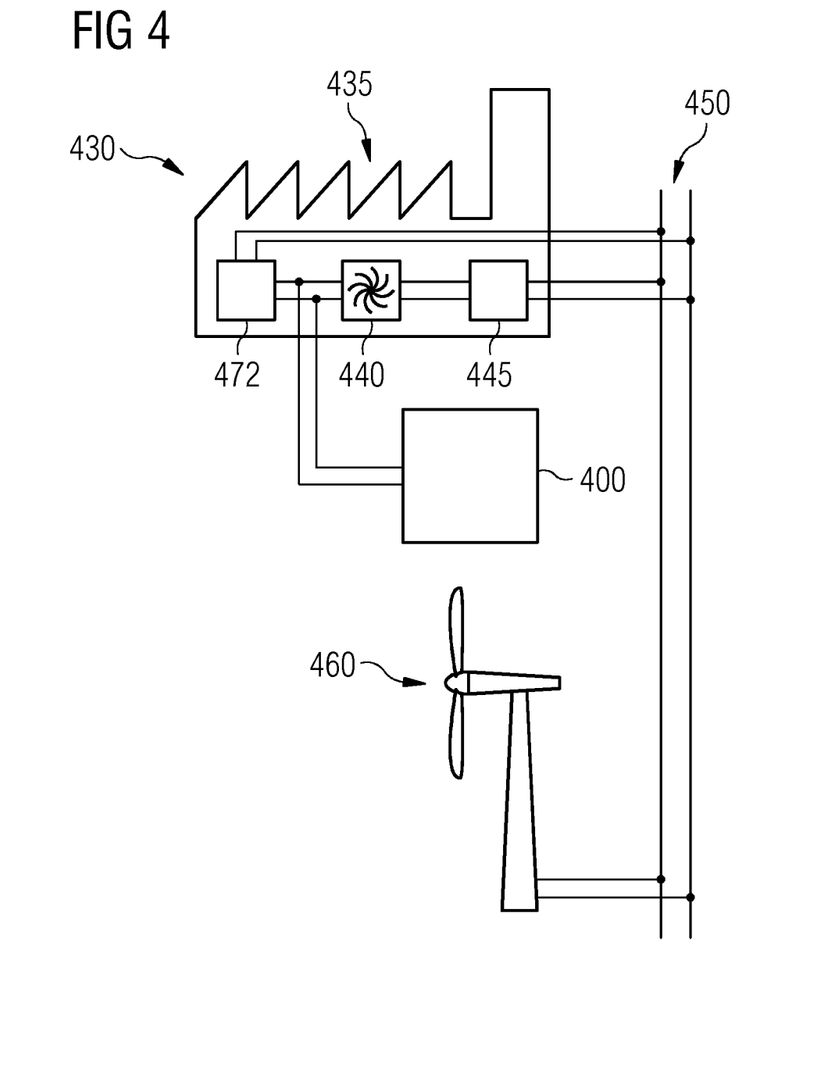
FIG. 4 shows a schematic illustration of a thermal energy storage and recovery system in accordance with a second embodiment of the invention.

FIG. 4 shows a schematic illustration of a thermal energy storage and recovery system 430 in accordance with a second embodiment of the invention. In this embodiment, a district heating installation or a thermal power generation plant 435 is connected to a utility grid 450 and to a thermal energy storage and recovery device 400. According to the embodiment described here the district heating installation or power generation plant 435 comprises a steam turbine 440 with a condenser (not shown) and a connected electrical power generator 445 and a compressor 472 with a built in motor. The compressor 472 may be replaced by an electrical boiler or may be supplemented by means of a heat pump system or other heating means.

The district heating installation or thermal power generation plant 435 is connected to the thermal energy storage and recovery device 400 both for energy storage and for recovering of stored energy. Also here a wind turbine 460 or other kind of alternative energy resources may be connected to the utility grid 450.

The compressor 472 with a built-in electrical motor may also comprise a mechanical connected air turbine (not shown) helping driving the compressor 472 together with the electrical motor. The air turbine may be connected to an outlet of a heat exchanger arrangement of the thermal energy storage and recovery device 400 receiving the cooled compressed air in the outlet.

Figure 5:
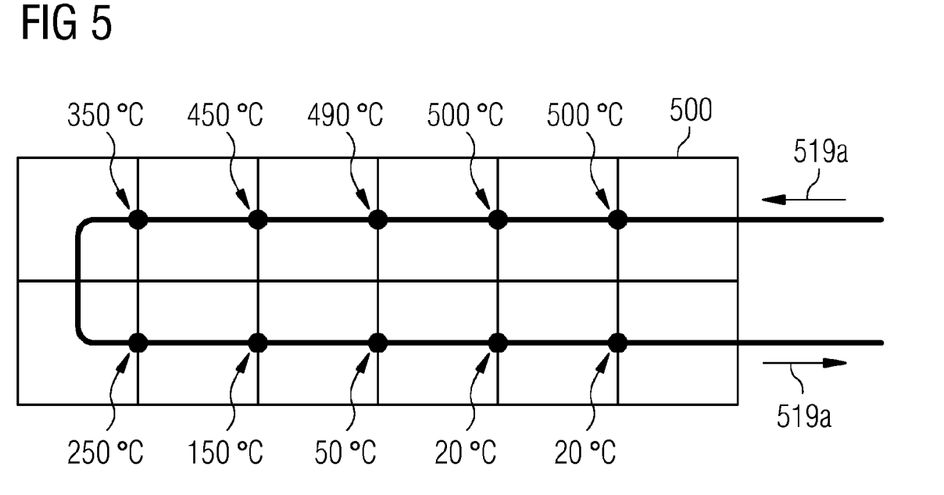
FIG. 5 illustrates an exemplary temperature profile along a pipe of the heat exchanger arrangement of the thermal energy storage device shown in FIG. 1.

FIG. 5 illustrates an exemplary temperature profile along a pipe of the heat exchanger arrangement of the thermal energy storage and recovery device shown in FIG. 1. The thermal energy storage and recovery device is now denominated with reference numeral 500. In FIG. 5 there is shown a thermal state of a thermal energy storage and recovery device 500 after a hot heat transfer medium has been flown through the heat exchanger arrangement at least for some time. This means that the thermal energy storage and recovery device 500 is at least partially charged with thermal energy. As a result, at various locations along heat exchanger arrangement, which are indicated as full circles, the following temperatures are present: 500° C., 500° C., 490° C., 450° C., 350° C., 250° C., 150° C., 50° C., 20° C., 20° C.

The flow direction of the heat transfer medium for charging the thermal energy storage and recovery device 500 is indicated with arrows 519a. In accordance with the above described counter current principle when retrieving thermal energy from the thermal energy storage and recovery device 400 the heat transfer medium is pumped in the opposite direction through the heat exchanger arrangement of the thermal energy storage and recovery device 400. If the thermal energy storage and recovery device 400 comprises a further heat exchanger arrangement being different from the heat exchanger arrangement, this further heat exchanger arrangement can be used for guiding a heat transfer medium which receives thermal energy from the heat storage material. In this way when retrieving energy from the thermal energy storage and recovery device 400 it is possible to heat up the cold heat transfer medium to nearly the same temperature as the inlet temperature of the hot fluid (i.e. hot compressed air) when charging the thermal energy storage device 400.

Figure 6:
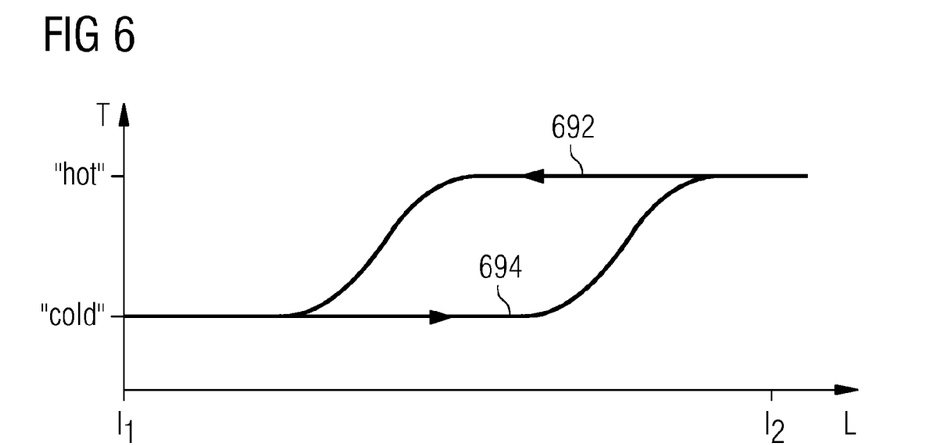
FIG. 6 illustrates the counter current principle by means of the local dependency of the temperature along the pipe of the heat exchanger arrangement, (a) when a heat transfer medium flows along a first direction for charging the thermal energy storage device with thermal energy and (b) when the heat transfer medium flows along a second opposite direction for discharging the thermal energy storage device.

FIG. 6 illustrates the counter current principle by means of the local dependency of the temperature along the pipe of the heat exchanger arrangement. On the abscissa there is plotted the position "L" of a measurement point along the pipe. On the ordinate there is plotted the respective temperature.

When charging the thermal energy storage device the originally hot heat transfer medium flows along the pipe from a hot inlet end "$l_2$" to a cold outlet end "$l_1$". Thereby, the temperature profile 692 will arise. When discharging the thermal energy storage device the originally cold heat transfer medium flows along the pipe from the hot inlet end "$l_1$" to the hot outlet end "$l_2$". Thereby, the temperature profile 694 will arise.

Generally speaking, FIG. 6 illustrates how the heat transfer medium may be respectively heated and cooled when the heat transfer medium is passing through a heat exchanger of a thermal energy storage device using the counter current principle. The temperature gradients for both charge and discharge are maintained throughout the length of the stream of the countercurrent system. In this way it is possible to heat up the cold heat transfer medium to substantially the same temperature as the used hot heat transfer medium (i.e. the heated up or hot compressed air).

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS

100 thermal energy storage and recovery device
102 casing/outer insulation wall
104 inner insulation wall
108 heat storage material
110 heat exchanger arrangement
112 first heat exchange section
112a first end
112b further first end
114 second heat exchange section
114a second end
114b further second end
116 first connecting section
116a valve
117 second connecting section
117a valve
118 third connecting section
118a valve
120 ground
300 thermal energy storage and recovery device
310 heat exchanger arrangement
311 further heat exchanger arrangement
330 thermal energy storage and recovery system
370 heat generating arrangement
372 compressor
372a air inlet
374 air turbine
374a air outlet (for air conditioning)
376 motor
377 common shaft
390 heat consumption arrangement
392 circulation pump
394 steam turbine
396 electric power generator
398 district heating installation
398a water inlet
398b water outlet
400 thermal energy storage and recovery device
430 thermal energy storage and recovery system
435 district heating installation/thermal power generation plant
440 steam turbine
445 electric power generator
450 utility grid
460 wind turbine
472 compressor
500 thermal energy storage and recovery device
519a flow direction
692 temperature profile during charging
694 temperature profile during discharging

The invention claimed is:

1. A thermal energy storage and recovery device comprising:
 a heat exchanger arrangement, which is configured for guiding a flow of a heat transfer medium between a first end of the heat exchanger arrangement and a second end of the heat exchanger arrangement, and
 a heat storage material, which surrounds the heat exchanger arrangement in such a manner that a thermal interaction region is formed for thermally coupling the heat transfer medium with the heat storage material,
  wherein the heat exchanger arrangement is sealed against the heat storage material in such a manner that, when the thermal energy storage and recovery device is in a first operational mode, in which the heat storage material is to receive thermal energy from the heat transfer medium, compressed gas, which has been heated up by a gas compression, is usable as the heat transfer medium for transferring thermal energy from the heat transfer medium to the heat storage material; and wherein the heat exchanger arrangement includes:
a first heat exchange section being associated with the first end,
a second heat exchange section being associated with the second end,
a first connecting section connecting the first heat exchange section with the second heat exchange section and
a second connecting section connecting the first heat exchange section with the second heat exchange section parallel to the first connecting section,
wherein at least one of the connecting sections comprises a valve for controlling the flow of the heat transfer medium through the respective connecting section.

2. The thermal energy storage and recovery device as set forth in claim 1, wherein the heat exchanger arrangement is adapted to
(a) transport the heat transfer medium from the first end to the second end, when the thermal energy storage and recovery device is in the first operational mode, and
(b) transport the heat transfer medium from the second end to the first end, when the thermal energy storage and recovery device is in a second operational mode, in which the heat storage material is to release thermal energy to the heat transfer medium.

3. The thermal energy storage and recovery device as set forth in claim 1, wherein the heat exchanger arrangement is made from pipes.

4. The thermal energy storage and recovery device as set forth in claim 1, further comprising:
a thermal insulation (a) for thermally isolating the whole thermal energy storage and recovery device from its environment and/or (b) for thermally isolating different compartments of the thermal energy storage and recovery device from each other.

5. The thermal energy storage and recovery device as set forth in claim 1, wherein the heat storage material comprises a solid material selected from the group consisting of sand, soil, ashes, stones gravel and combinations thereof.

6. The thermal energy storage and recovery device as set forth in claim 1, wherein the first end comprises a single first opening and the second end comprises a single second opening,
wherein when in the first operational mode the first opening is used for receiving compressed gas, which has been heated up by a gas compression, and the second opening is used for emitting cooled down compressed gas and
wherein when in the second operational mode the second opening is used for receiving a cold fluid and the first opening is used for emitting a hot fluid representing heated up cold fluid.

7. The thermal energy storage and recovery device as set forth in claim 1, further comprising:
a further heat exchanger arrangement, which is configured for guiding a flow of a further heat transfer medium between a further first end of the further heat exchanger arrangement and a further second end of the further heat exchanger arrangement, and
a further heat storage material, which surrounds the further heat exchanger arrangement in such a manner that a further thermal interaction region is formed for thermally coupling the further heat transfer medium with the further heat storage material.

8. The thermal energy storage and recovery device as set forth in claim 7, wherein the heat exchanger arrangement and the further heat exchanger arrangement form a counter current heat exchanger system,
wherein the further heat transfer medium and the heat transfer medium are transportable simultaneously and
wherein the further heat transfer medium is transportable in an opposite direction with respect to the heat transfer medium.

9. A thermal energy storage and recovery system comprising
a thermal energy storage and recovery device as set forth in claim 1,
a heat generating arrangement, which is connected directly or indirectly to the thermal energy storage and recovery device and which is adapted to heat up the heat transfer medium, which has been received from the thermal energy storage and recovery device and which is to be transported to the thermal energy storage and recovery device, and
a heat consumption arrangement, which is connected directly or indirectly to the thermal energy storage and recovery device and which is adapted to receive thermal energy from heat transfer medium, which has been heated up by the thermal energy storage and recovery device.

10. The thermal energy storage and recovery system as set forth in claim 9, wherein the heat generating arrangement comprises:
a compressor for feeding the thermal energy storage and recovery device with the compressed gas, which has been heated up by the gas compression, and
a gas turbine for receiving from the thermal energy storage and recovery device cooled down heat transfer medium.

11. The thermal energy storage and recovery system as set forth in claim 10, wherein the gas turbine comprises a gas outlet for delivering outlet gas being used for cooling surrounding air in at least one room of at least one building.

12. The thermal energy storage and recovery system as set forth in claim 9, wherein the heat generating arrangement further comprises a motor driving the compressor,
wherein the gas turbine is mechanically connected to the motor.

13. The thermal energy storage and recovery system as set forth in the claim 12,
wherein the heat consumption arrangement comprises:
a steam turbine, which in the second operational state receives hot heat transfer medium from the thermal energy storage and recovery device, and/or
a circulation pump for feeding a cold heat transfer medium to the thermal energy storage and recovery device.

14. The thermal energy storage and recovery system as set forth in the claim 13, wherein the heat consumption arrangement further comprises a district heating installation system, which receives heat transfer medium from the steam turbine (394) and which provides heat transfer medium to the circulation pump.

15. The thermal energy storage and recovery system as set forth in claim 9, further comprising:
a control unit, which is connected to at least one of (a) the thermal energy storage and recovery device, (b) the heat generating arrangement and (c) the heat consumption arrangement,
wherein the control unit is adapted to control the operation of the thermal energy storage and recovery system.

* * * * *